(12) United States Patent
Castelli et al.

(10) Patent No.: US 8,660,836 B2
(45) Date of Patent: Feb. 25, 2014

(54) OPTIMIZATION OF NATURAL LANGUAGE PROCESSING SYSTEM BASED ON CONDITIONAL OUTPUT QUALITY AT RISK

(75) Inventors: Vittorio Castelli, Croton-on-Hudson, NY (US); David Nahamoo, Great Neck, NY (US); Bing Zhao, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 13/073,255

(22) Filed: Mar. 28, 2011

(65) Prior Publication Data

US 2012/0253783 A1    Oct. 4, 2012

(51) Int. Cl.
  *G10L 15/00*    (2013.01)
(52) U.S. Cl.
  USPC .................................. 704/8; 704/2
(58) Field of Classification Search
  USPC ............................................. 704/2, 8
  See application file for complete search history.

(56) References Cited

U.S. PATENT DOCUMENTS

| | | | |
|---|---|---|---|
| 5,477,451 A * | 12/1995 | Brown et al. | 704/9 |
| 5,991,710 A * | 11/1999 | Papineni et al. | 704/2 |
| 8,265,923 B2 * | 9/2012 | Chatterjee et al. | 704/2 |
| 2002/0169592 A1 | 11/2002 | Aityan | |
| 2005/0288919 A1 | 12/2005 | Wang | |
| 2007/0294233 A1 | 12/2007 | Sheu et al. | |
| 2008/0126149 A1 | 5/2008 | Kloess et al. | |
| 2008/0234947 A1 | 9/2008 | Seymour | |
| 2008/0243481 A1 | 10/2008 | Brants et al. | |
| 2010/0004920 A1 | 1/2010 | Macherey et al. | |
| 2010/0023315 A1 | 1/2010 | Quirk | |
| 2010/0138402 A1 | 6/2010 | Burroughs et al. | |
| 2010/0251224 A1 | 9/2010 | Cheriton | |
| 2010/0262575 A1 | 10/2010 | Moore et al. | |
| 2011/0282643 A1 * | 11/2011 | Chatterjee et al. | 704/2 |

OTHER PUBLICATIONS

B-J. Hsu et al., "Language Model Parameter Estimation Using User Transcriptions," IEEE International Conference on Acoustics, Speech and Signal Processing (ICASSP), Apr. 2009, pp. 4805-4808.
IBM TDB, "Structured, Universal Natural-Language Generator for Sophisticated Target-Language Generation in Machine Translation Systems," www.ip.com, Oct. 1988, 2 pages.

(Continued)

*Primary Examiner* — Daniel D Abebe
(74) *Attorney, Agent, or Firm* — Anne V. Dougherty; Ryan, Mason & Lewis, LLP (57) ABSTRACT

Techniques are disclosed for optimizing results output by a natural language processing system. For example, a method comprises optimizing one or more parameters of a natural language processing system so as to improve a measure of quality of an output of the natural language processing system for a first type of data processed by the natural language processing system while maintaining a given measure of quality of an output of the natural language processing system for a second type of data processed by the natural language processing system. For example, the first type of data may have a substantive complexity that is greater than that of the second type of data. Thus, when the natural language processing system is a machine translation system, use of a conditional value at risk metric for the translation quality provides for a high quality output of the machine translation system for data of a high substantive complexity (for sophisticated users) while maintaining an average quality output for average data (for average users).

23 Claims, 6 Drawing Sheets (56) References Cited

OTHER PUBLICATIONS

Franz Josef Och, "Minimum Error Rate Training in Statistical Machine Translation," Proceedings of the 41st Annual Meeting of the Association for Computational Linguistics, Jul. 2003, pp. 160-167.

B. Zhao et al., "A Simplex Armijo Downhill Algorithm for Optimizing Statistical Machine Translation Decoding Parameters," Proceedings of NAACL HLT, Short Papers, Jun. 2009, pp. 21-24.

K. Papineni et al., "BLEU: A Method for Automatic Evaluation of Machine Translation," Proceedings of the 40th Annual Meeting of the Association for Computational Linguistics (ACL), Jul. 2002, pp. 311-318.

K.A. Papineni, "Discriminative Training via Linear Programming," IEEE International Conference on Acoustics, Speech, and Signal Processing (ICASSP), Mar. 1999, pp. 561-564, vol. 2.

Philipp Koehn, "Pharaoh: A Beam Search Decoder for Phrase-Based Statistical Machine Translation Models," Proceedings of the Conference of the Association for Machine Translation in the Americas (AMTA), 2004, pp. 115-124, vol. 3265.

S. Vogel et al., " The CMU Statistical Machine Translation System," Proceeding of the MT Summit IX, Sep. 2003, 8 pages.

* cited by examiner

ALGORITHM 1 SIMPLEX ARMIJO DOWNHILL ALGORITHM

1: $\alpha \Leftarrow 1, \gamma \Leftarrow 2, \rho \Leftarrow 0.5, \beta = \eta \Leftarrow 0.9, \epsilon \Leftarrow 1.0 \times 10^{-6}$
2: initilize $(\lambda_1, \ldots, \lambda_{M+1})$
3: while $\sum_{i,j=1}^{M+1} \|\lambda_i - \lambda_j\|_2 \leq \epsilon$ do
4:   sort $\lambda_i$ ascend
5:   $\lambda_0 \Leftarrow \frac{1}{N} \sum_{i=1}^{M} \lambda_i,$
6:   $\lambda_r \Leftarrow \lambda_0 + \alpha(\lambda_0 - \lambda_{M+1})$
7:   if $S(\lambda_1) \leq S(\lambda_r) \leq S(\lambda_M)$ then
8:     $\lambda' \Leftarrow \lambda_r$
9:   else if $S(\lambda_r) < S(\lambda_1)$ then
10:     $\lambda_e \Leftarrow \lambda_0 + \gamma(\lambda_0 - \lambda_{M+1})$
11:     if $S(\lambda_e) < S(\lambda_r)$ then
12:       $\lambda' \Leftarrow \lambda_e$
13:     else
14:       $\lambda' \Leftarrow \lambda_r$
15:     end if
16:   else if $S(\lambda_r) > S(\lambda_M)$ then
17:     $\lambda_c \Leftarrow \lambda_{M+1} + \rho(\lambda_0 - \lambda_{M+1})$
18:     if $S(\lambda_c) < S(\lambda_r)$ then
19:       $\lambda' \Leftarrow \lambda_c$
20:     else
21:       try points on two additional lines for $\lambda'$
22:     end if
23:   end if
24:   $d \Leftarrow \lambda' - \lambda_{M+1}$
25:   $\beta^* \Leftarrow max_{k=0,1,\ldots,40}\{\beta^k | S(\lambda_{M+1} + \beta^k d) - S(\lambda_{M+1}) \leq -\eta\|d\|_2 \beta^k\}$
26:   $\lambda^+ = \lambda_{M+1} + \beta^* * d$
27:   replace $\lambda_{M+1}$ with $\lambda^+$
28: end while

OPTIMIZATION OF NATURAL LANGUAGE PROCESSING SYSTEM BASED ON CONDITIONAL OUTPUT QUALITY AT RISK

This invention was made with Government support under Contract No.: HR0011-08-00110 awarded by Defense Advanced Research Projects Agency (DARPA). The Government has certain rights in this invention.

FIELD OF THE INVENTION

The present invention relates to natural language processing systems and, more particularly, to optimizing results output by such natural language processing systems.

BACKGROUND OF THE INVENTION

An example of a natural language processing system is an automated machine translation (MT) system. Such automated machine translation systems translate text in a first language to text in a second language. Certain automated machine translation systems share the following framework. The systems use word-alignments that are produced by models such as translation models. Rules are extracted from a word-aligned corpus using heuristics. A log-linear model combines commonly used features whose weights are optimized on a development set (e.g., a handful of sentences) using reference translations for automatic machine translation evaluation metrics. A beam-search decoder is used to generate final translations.

Optimizing machine translation parameters (i.e., wherein the parameters are weights associated with the features used in the log-linear model) has been shown to be a piece-wise linear problem, and algorithms such as those employing minimum error rate training techniques have been widely applied.

The translation quality of the output text of a machine translation system is typically measured via automatic metrics including BLEU (Bilingual Evaluation Understudy), TER (Translation Edit Rate), WER (Word Error Rate), METEOR (Metric for Evaluation of Translation with Explicit Ordering), n-gram precisions, and their variants. The automatic evaluation metrics are computed on the given source sentences and their human translation references.

SUMMARY OF THE INVENTION

Principles of the present invention provide techniques for optimizing results output by a natural language processing system.

For example, in one aspect of the invention, a method comprises optimizing one or more parameters of a natural language processing system so as to improve a measure of quality of an output of the natural language processing system for a first type of data processed by the natural language processing system while maintaining a given measure of quality of an output of the natural language processing system for a second type of data processed by the natural language processing system.

In one embodiment, the first type of data has a substantive complexity that is greater than that of the second type of data. For example, the first type of data may be presented to the natural language processing system by a sophisticated type of user and the second type of data may be presented to the natural language processing system by an average type of user. Of course, while users may be of one type or the other, the same user may be considered a sophisticated user for one processing task and an average user for a different processing task.

The optimizing step may further comprise computing a conditional value at risk metric, wherein the conditional value at risk metric represents a level of risk aversion for one or more users of the natural language processing system associated with the quality of the output of the natural language processing system.

Advantageously, when the natural language processing system is a machine translation system, use of a conditional value at risk metric for the translation quality provides for a high quality output of the machine translation system for data of a high substantive complexity (for sophisticated users) while maintaining an average quality output for average data (for average users).

These and other objects, features, and advantages of the present invention will become apparent from the following detailed description of illustrative embodiments thereof, which is to be read in connection with the accompanying drawings.

DETAILED DESCRIPTION OF PREFERRED EMBODIMENTS

Principles of the invention will be illustratively described herein in the context of one or more automated machine translation systems. However, it is to be appreciated that the principles of the invention are not limited to any particular system architecture and are more generally applicable to any natural language processing system in which it would be desirable to optimize one or more results associated with the natural language processing system.

As used herein, the phrase "natural language processing" (NLP) generally refers a field of computer science and linguistics related to interactions between computers and human (natural) languages. Thus, since a machine translation system is an example of a natural language processing system, "machine translation" generally refers to a technique for translating, under control of a computer system, text in a first natural language (by way of example only, the English language) to text in a second natural language (by way of example only, one of the Chinese family of languages or the Italian language).

It is to be further understood that the text input to the machine translation system may be generated via an automated speech recognition (ASR) system which, as is known, receives spoken utterances from a speaker and converts (decodes) the spoken utterances to text. Thus, a speaker could speak in the first natural language, and the ASR resulting text would serve as the input to the machine translation system. Similarly, the text that is output in the second natural language by the machine translation system could serve as an input to an automated text-to-speech (TTS) system which, as is known, converts the text to speech that is audibly presented to a listener in the second natural language. However, it is to be appreciated that principles of the invention focus on machine translation systems (more generally, natural language processing systems) and not ASR or TTS systems.

It is realized that customers of natural language processing systems, for example, machine translation customers (which, in accordance with one or more illustrative embodiments, we use to exemplify the problem and our solution), differ in many aspects and range from low-profile users who desire free and digestible translations for easy foreign materials ("naïve" users) to sophisticated users with strict requirements on translation quality on potentially more complex and domain-specific materials. The former types of users are the majority, while the latter types of users are potentially a main source of revenue for a profitable translation-software service. These two types of users are at the two extreme ends of a spectrum modeled by a customer distribution. Also, a user can be a mixture of different types in the spectrum, or switch between types at different times. As used herein, a "customer distribution" is a description of how likely a machine translation (MT) user, e.g., an individual or a business unit, is willing to pay for machine translation services for translated data. The distribution is a table look-up. A user is associated a float value between [0,1] (inclusive), with "0" representing the naive user who does not want to pay, and "1" the sophisticated user who is willing to pay and is very serious about translation quality for their business or domain. To obtain this customer distribution, one can simply ask users to input their preferences directly, via incentives like 1-month free membership, etc. It is to be appreciated that the difference between sophisticated users versus average users can be characterized in other ways.

Existing statistical machine translation systems are data-driven. Statistical machine translation generates translations (text input in a first natural language converted to text in a second natural language) using statistical methods based on bilingual text corpora. The parameters of these systems are usually optimized for a collection of sentences, based on an average metric, e.g. BLEU, METEOR, TER or WER, on the entire data. The BLEU metric, described in K. Papineni et al, "BLEU: A Method for Automatic Evaluation of Machine Translation," ACL-2002: 40th Annual Meeting of the Association for Computational Linguistics, Philadelphia, Pa., USA, 2002, the disclosure of which is incorporated by reference herein, is a geometric mean of n-gram precision, together with length penalties for long translations simulating the recall. TER is defined as the sum of four types of errors: insertion, deletion, substitution, and swap. WER is simply defined as the sum of the insertion, deletion and substitution errors. For BLEU, the larger the score is, the better the translation quality is; for TER and WER, the lower the better. Herein, we convert TER and WER to be score-like by simply using 1-TER and 1-WER, so that the machine translation (MT) metrics used herein share the same characteristics: the larger the better.

Existing data-driven approaches ignore the spectrum of the potential customers (they fail to model users as belonging to discrete groups or to a distribution), which can lead to lower translation quality for potential customer groups. As a consequence, for example, existing approaches cannot handle both naïve and sophisticated users, i.e., the systems are optimized for an "average customer's" need at the expense of specific customer group's needs. The straight alternative of substituting the average metric by a metric that gives more weight to a specific domain/group is usually not desired either. For example, if we optimize for advanced users on the complex (difficult) materials, e.g. technical jargons in chemistry, we are at a risk to reduce the quality of the translations of the easy materials used by majority of users. Finally, indiscriminately adding more data is both expensive (collecting parallel corpora is a labor-intensive work, requiring multiple human translation of the same documents) and ineffective (it is practically impossible to collect enough data to cover all possible scenarios of interest to the sophisticated users as well as to collect the extremely fluid web/community content that a typical user is exposed to everyday).

To address the challenges associated with adding large amounts of data and the average performance metric, illustrative principles of the invention provide a methodology that allows for optimizing the machine translation system for a specific customer group, e.g., advanced users (who are willing to pay), while at the same time maintaining the same translation quality (as in a baseline system) for the average users, e.g., naïve users who use machine translation service mainly for free. The inventive approach simulates the distribution of customers' needs, and optimizes the machine translation parameters for the customer distribution instead of a simple function (such as the mean of the distribution) of such distribution. That is, illustrative principles of the invention optimize the statistical machine translation system parameters for the shape defined on a conditional translation quality simulating machine translation customers, instead of a point defined on some corpus, as in all the existing approaches.

More specifically, illustrative principles of the invention optimize the parameters of machine translation systems by considering the conditional translation value at risk computed from a given data collection provided by translation users, or directly marked and specified by translation users during run time, to ensure that the decoding parameters are optimized to address the more difficult part of the task (simulating the worst-cases scenario for advanced users), without at the same time decreasing the average translation quality.

Accordingly, illustrative principles of the invention provide an addition to a translation service (be it single software copies, plug-ins, or general web-based software services) in the form of an enhancement to adjust the translation model space dynamically over time by accepting user specifications on their risk indexes, as will be described in detail herein, from their broad translation needs (e.g., from simple weather report to medical domain specific data).

One main advantage of the inventive approach is that it optimizes the distribution of the translation quality metric over the user spectrum, while existing methods just optimize a simple function of this distribution (e.g., the average) either over the entire user population, or for a specific group of users. For example, consider a usage scenario where a translation service is required to translate both generic documents, such as web pages, and technical documents in a specific field, such as medicine or chemistry. A generic translation engine will do a substantially better job at translating the generic documents, while the quality of the translation of the technical documents would be typically lower. This is due to the fact that a generic translation engine is constructed to translate sufficiently well a wide variety of documents, and as a consequence lacks the finesse to translate appropriately technical documents. However, while a user might find it acceptable to have an average quality translation of a general document, the same user would be less tolerant of translation mistakes on a technical document. The same is true for different users, i.e., an average user would tolerate a poor to average quality translation for average complexity documents, while the sophisticated user would not tolerate a poor to average quality translation for substantively complex documents.

Illustrative principles of the invention, described in detail herein in the context of one or more embodiments, address the needs of such users by improving the quality of translation of technical documents while avoiding degradation of the translation quality for generic documents.

Figure 1:
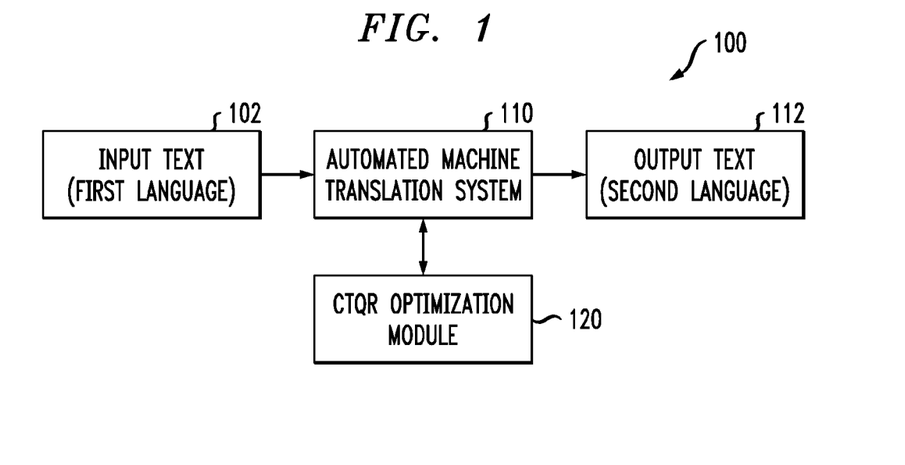
FIG. 1 illustrates an automated machine translation system using a conditional translation quality at risk metric for optimization, according to an embodiment of the invention.

Referring initially to FIG. 1, an automated machine translation system using a conditional translation quality at risk metric for optimization is shown. In this illustrative embodiment of the invention, we achieve the above and other goals by optimizing an objective function that we have developed and called a conditional translation quality at risk (CTQR) metric.

The CTQR metric is a conditional value at risk (VAR) metric. A VAR metric generally is a measure of a risk of loss (i.e., a loss distribution) for some specific given entity or item. For example, the risk of loss may relate to a level of risk aversion that a user of a machine translation system would have to a poor to average translation being output by the machine translation system. Thus, for example, as explained above, a doctor may have a high level of risk aversion to a poor to average translation quality for a critical medical record of a patient, while the doctor would have a lower level of risk aversion to a poor to average translation quality for a web page giving him/her general information about a vacation destination. The same is true for different users (i.e., sophisticated users versus average users). Further, as explained above, the CTQR is a conditional VAR metric. A conditional VAR metric is a VAR metric that is more sensitive to the shape of the loss distribution in the tail of the distribution. Thus, by using a conditional VAR metric for the translation quality of a machine translation system, illustrative principles of the invention provide for a high quality output of a machine translation system for data of a higher substantive complexity while maintaining an average quality output for average data. In one illustrative embodiment, the conditional translation quality at risk metric is computed as the median of the tail of the customer distribution.

As generally depicted in the automated machine translation system 100, an input text set 102 (e.g., document, record, web page, ASR decoded conversation, etc.) in a first natural language is provided to an automated machine translation system 110. The automated machine translation system 110 translates the input text and generates an output text set 112 (e.g., document, record, web page, ASR decoded conversation, etc.) in a second natural language. That is, the system 110 translates the input document from the first language to the second language.

Advantageously, a CTQR optimization module 120 is provided as shown in FIG. 1, which optimizes the text output by the automated machine translation system 110 using the conditional translation quality at risk (CTQR) metric, as will be explained in detail herein.

Note that the CTQR optimization module 120 is shown in FIG. 1 as a block separate from the automated machine translation system 110. However, it is to be understood that this is for illustration purposes only and that the CTQR optimization module 120 can be part of the automated machine translation system 110. That is, in one embodiment, the optimizer 120 may be functionally embedded with the one or more translation engines that perform the MT functions of system 110.

Figure 2:
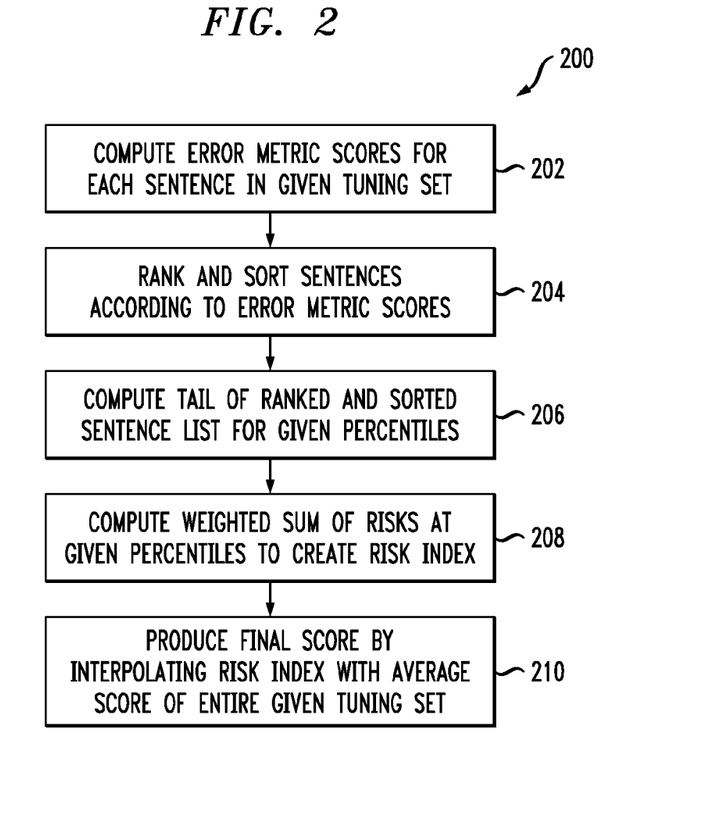
FIG. 2 illustrates a methodology for computing a conditional translation quality at risk metric, according to an embodiment of the invention.

FIG. 2 illustrates a methodology 200 for computing a conditional translation quality at risk (CTQR) metric, according to an embodiment of the invention. This methodology is performed by CTQR optimization module 120 in conjunction with the automated machine translation system 110 in FIG. 1.

As shown, in step 202, error metric scores are computed by module 120 for each sentence in a given collection of sentence pairs distinct from the training data, whose purpose is to fine-tune the parameters of the model, henceforth referred to as the "tuning set." Next, in step 204, the sentences are ranked and sorted according to the error metric scores computed in step 202.

In step 206, the tail of the ranked and sorted sentence list is computed by the module 120 at different given percentiles such as, for example, 90%, 95%, 98%, etc. Next, in step 208, a weighted sum of the risks is computed at these given percentiles. The result of this computation is referred to as the "risk index."

Then, in step 210, the module 120 produces a final score by interpolating the risk index with the average score of the entire given tuning set.

The following is an example of applying method 200 to a tuning set:

Starting point: tuning set: pairs of sentence-translated sentences:

| Sent1 TrSent1, |
| Sent2 TrSent2 |
| ... |
| SentM TrSentM | where Tr denotes translated, and M is the actual number of pairs in the tuning set.

After step 202, we have:

| Sent1 TrSent1 | 0.53 |
| Sent2 TrSent2 | −2.5 |
| ... | |
| SentM TrSentM | 23.15 | where the numbers are the error metric scores computed by step 202 for the corresponding sentence (their values here are arbitrary and used as examples).

After step 204, we have:

| Sent1' TrSent1' | 52012.2 |
| Sent2' TrSent2' | 51032.5 |
| ... | |
| SentM' TrSentM' | −193.5 | where the scores are ordered in descending orders, and the 'prime' sign indicates the order in the sorted collection.

After step 206, the method 200 determines that the score at the desired percentile (e.g., at the 95% tail) is, for example, 13.2, which is derived from the data. This means that 5% of the data has a score equal or lower than 13.2, the remaining 95% has a score higher than 13.2.

During step 208, the method 200 uses the data with a score equal to or less than 13.2, as determined by step 206, to compute a risk at this given tail score. The method repeats step 206 for different values of the tail score, and computes the corresponding risk. The method 200 then combines the different risks using a linear combination, that is, a weighted sum. The simplest weighted sum assigns the same weight to all the risks. For example, assume that the method selected the tails at 95% and at 98%, which result in risks equal to 13.2 and 10. Then, the value produced by step 208 would be, for example (13.2+10)/2=11.6.

During step 210, the method computes the average score of the tuning set, e.g., 105.5, and interpolates with the weighted score computed during step 208. The simplest interpolation is an average, so the value produced by step 210 would be (105.5+11.6)/2=56.55

Figure 3:
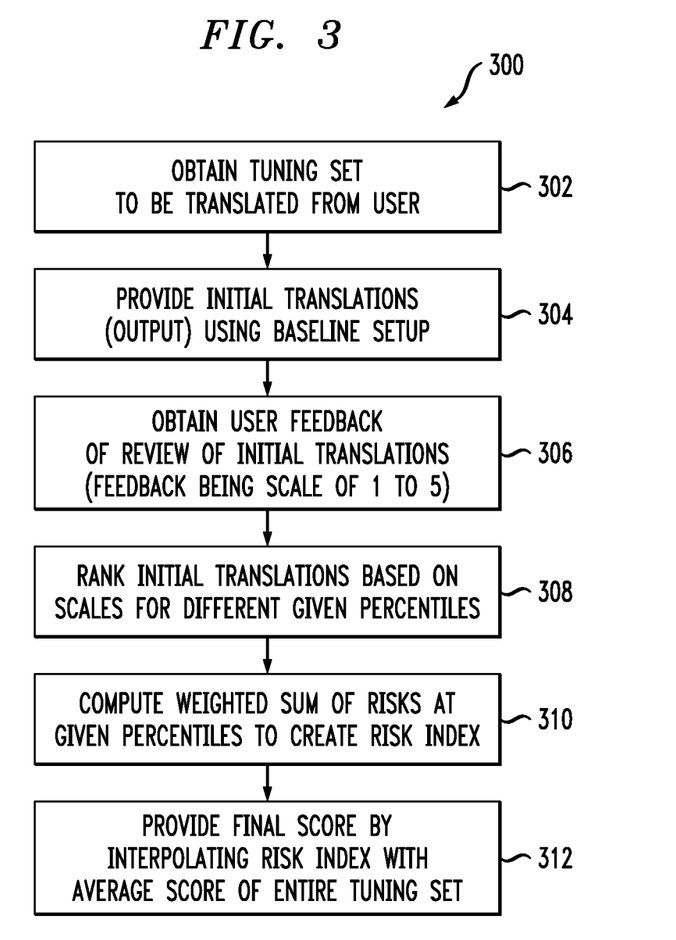
FIG. 3 illustrates a methodology for computing a conditional translation quality at risk metric, according to another embodiment of the invention.

FIG. 3 illustrates a methodology 300 for computing a CTQR metric, according to another embodiment of the invention. Again, this methodology is performed by CTQR optimization module 120 in conjunction with the automated machine translation system 110 in FIG. 1. In this alternative embodiment, as compared to the one shown in FIG. 2, the methodology 300 leverages limited human interactions, as will be evident.

In step 302, the user provides a tuning set to be translated. For example, the optimization module obtains typical data that the user would need to be translated. Next, in step 304, the module 120 provides initial translations of the typical text set using a baseline setup, that is, a system without the inventive optimization described herein.

Then, in step 306, the module 120 obtains user feedback of a manual user review of the initial translations. That is, the module 120 prompts the user to check the initial translations and rate them based on given scales (scores), for example, from 1 to 5, with 1 being a good translation in the user's opinion, and 5 being a poor translation in the user's opinion.

In step 308, the initial translations are ranked based on the user-provided scales. The ranking is done for different given percentiles such as, for example, 90%, 95%, 98%, etc. Then, as in FIG. 2, a weighted sum of the risks is computed at these given percentiles in step 310. The result of this computation is referred to as the "risk index." Finally, in step 312, the module 120 produces a final score by interpolating the risk index with the average score of the entire given tuning set.

Thus, as is evident, steps 310 and 312 of FIG. 3 are identical to steps 208 and 210 of FIG. 2, but for the fact that they are computed on data provided by the user. In step 302, the user, who is, for example, the local Chamber of Commerce, provides as typical text documents detailing the local regulations for tourism-related business. The method 300 translates these documents and provides the translations to the representative of the Chamber of Commerce. This is what is done in step 304. The representative scores each document, for example, via a user interface (not shown, but that is part of the CTQR module 120) that has a radio-button with 5 different numbers, 1 representing a terrible translation, 5 a perfect translation (where scores of 2, 3 and 4 respectively represent increasingly better translation qualities). This is what is done in step 306. The resulting data is fed to the ranking step 308, which is analogous to step 204 but based on the feedback scores (1 to 5 in the example) rather than error metric scores. Then, steps 310 and 312 are performed as explained above.

It is to be appreciated that the error metric scores in step 202 of FIG. 2 can be any standard measure including, but not limited to, TER, BLEU, n-gram precisions, METEOR, and variations and mixtures of these scores. The final score (step 210 and 312) is a single number, quantifying the conditional translation quality at the risk ranked at different percentiles. The advantage of this approach is that it concentrates the focus on the high-risk sentences in the tuning set, while keeping the average score to be the same as before (the existing baseline translation service).

One of ordinary skills in the art would appreciate that, by computing the CTQR, one is able to identify the characteristics of the machine translation system's behaviors on both easy and difficult materials, and predict the likelihood of translation quality losses exceeding a certain value at risk. By embedding such criterion within an optimizer (i.e., module 120) for optimizing machine translation system (i.e., machine translation system 110) parameters, we enable the system to perform well on unseen difficult cases, while guaranteeing quality for the majority on easy materials.

In one illustrative embodiment, the optimization algorithm uses a more generalized algorithm than those used in the art, i.e., an algorithm referred to as a simplex-downhill algorithm. The simplex-downhill algorithm is a linear-search technique based on heuristics, and is realized to be more effective than the standard Minimum Error-Rate training, or MER, see, B. Zhao et al., "A Simplex Armijo Downhill Algorithm for Optimizing Statistical Machine Translation Decoding Parameters," Proceedings of the North American Chapter of the Association for Computational Linguistics—Human Language Technologies (NAACL HLT-2009), Denver, Colo., USA, the disclosure of which is incorporated by reference herein in its entirety.

After computing the conditional translation quality at different risks, as illustratively described above in the embodiments of FIGS. 2 and 3, we propose to embed in each iteration of the overall optimization algorithm that is executed by the optimization module 120, a set of lower-dimension simplexes for optimizing the parameters for improving the conditional translation quality at different risks. Here, the general iteration algorithm could be, for example, MER or simplex-downhill, but in one preferred embodiment, we employ simplex-downhill.

Figure 4A:
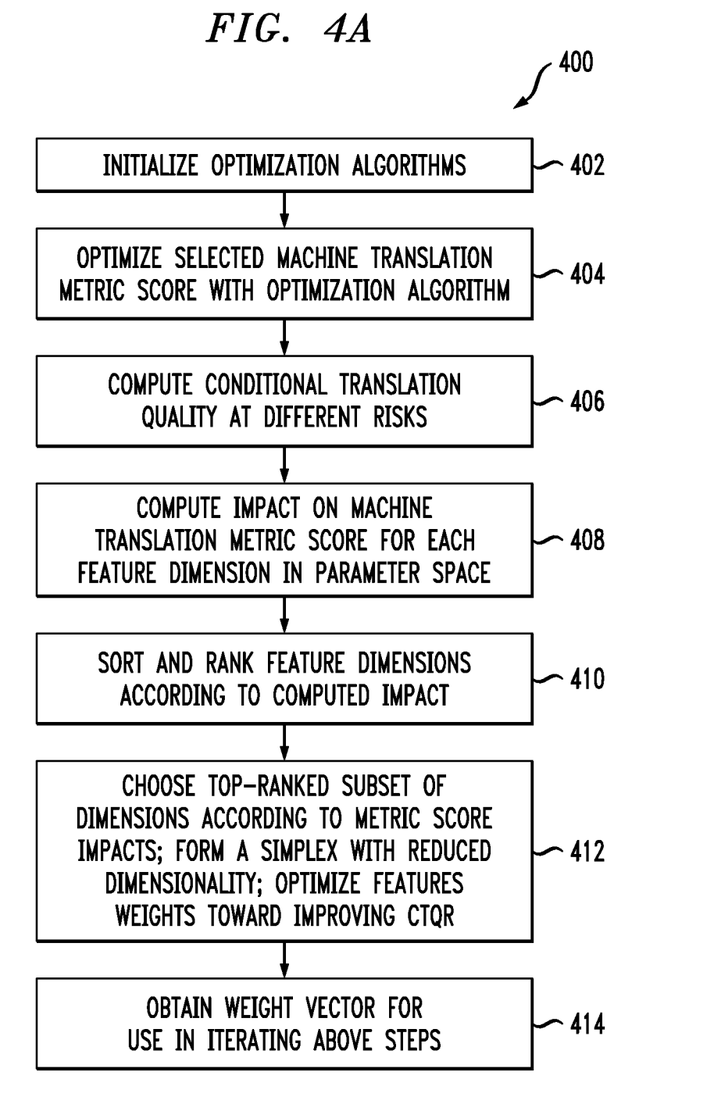
FIG. 4A illustrates a methodology for optimizing an automated machine translation system using a conditional translation quality at risk metric, according to an embodiment of the invention.

Accordingly, FIG. 4A illustrates a methodology 400 for optimizing an automated machine translation system using a CTQR metric, according to an embodiment of the invention, which accomplishes the above embedding step. Again, this methodology is performed by the optimization module 120 in conjunction with the automated machine translation system 110 in FIG. 1.

First, in step 402, the module 120 initializes one or more optimization algorithms using a perturbation of a seed with prior knowledge such as, for example, an upper-bound of a weight, a lower-bound of a weight, or any heuristics for a weight toward a better conditional translation quality at different risks, or simply the automatic machine translation scores.

In step 404, the module 120 optimizes the selected machine translation metric score with an optimization algorithm such as, for example, any iterative general optimization algorithm. The translation metric could be, for example BLEU, METEOR, TER, or weighted mixture of these scores. For example, general algorithms that could be employed include, but are not limited to, standard MER (see, e.g., F. Josef, "Minimum Error Rate Training in Statistical Machine Translation," Proceedings of the 41st Annual Meeting of the Association for Computational Linguistics, Sapporo, Japan, 2003, the disclosure of which is incorporated by reference herein in its entirety) or simplex-based algorithms (see, e.g., the above-referenced B. Zhao et al., "A Simplex Armijo Downhill Algorithm for Optimizing Statistical Machine Translation Decoding Parameters").

Next, in step 406, the conditional translation quality at different risks is computed using either method described above (FIG. 2 or FIG. 3), for the translation outputs computed at each iteration using the weight vector generated from the algorithm in step 404.

In step 408, the module 120 computes the impact on the automatic machine translation metric score for each feature dimension in the machine translation parameter space. This step is performed to rank the features' sensitivities to the translation qualities.

Next, in step 410, the feature dimensions are ranked and sorted according to their impact on the aforementioned metric scores.

In step 412, the top-ranked subset of the dimensions is chosen according to their metric-score impacts such as, for example, the top-3 impacting feature dimensions. A simplex is then formed with reduced dimensionality. Then, a simplex-downhill or any suitable optimization algorithm which handles a piece-wise linear type of problem is executed to optimize the features' weights for improving the conditional translation quality at risk, as defined herein.

Lastly, in step 414, a weight vector is obtained after the above-described optimization procedures. The weight vector is then used as a new seed to initialize random restarts to steps 402 through 410 again iteratively.

As the optimization itself is a piece-wise linear problem, the embedded lower-dimension optimization step, which is a line-search, will have the same convergence nature of the outer loop of the general algorithm. A person ordinarily skilled in the art would appreciate that the embedded line-search can change the trajectory of the outer loop of the optimization algorithm, emphasizing more on low risks path, without sacrificing the original optimization quality criteria (frequently, we observed even better results) and the convergence nature. The inventive approach effectively updates those parameters that are influential for handling the difficult part of the problem, which is characterized by the conditional translation quality at risk as computed.

Figure 4B:
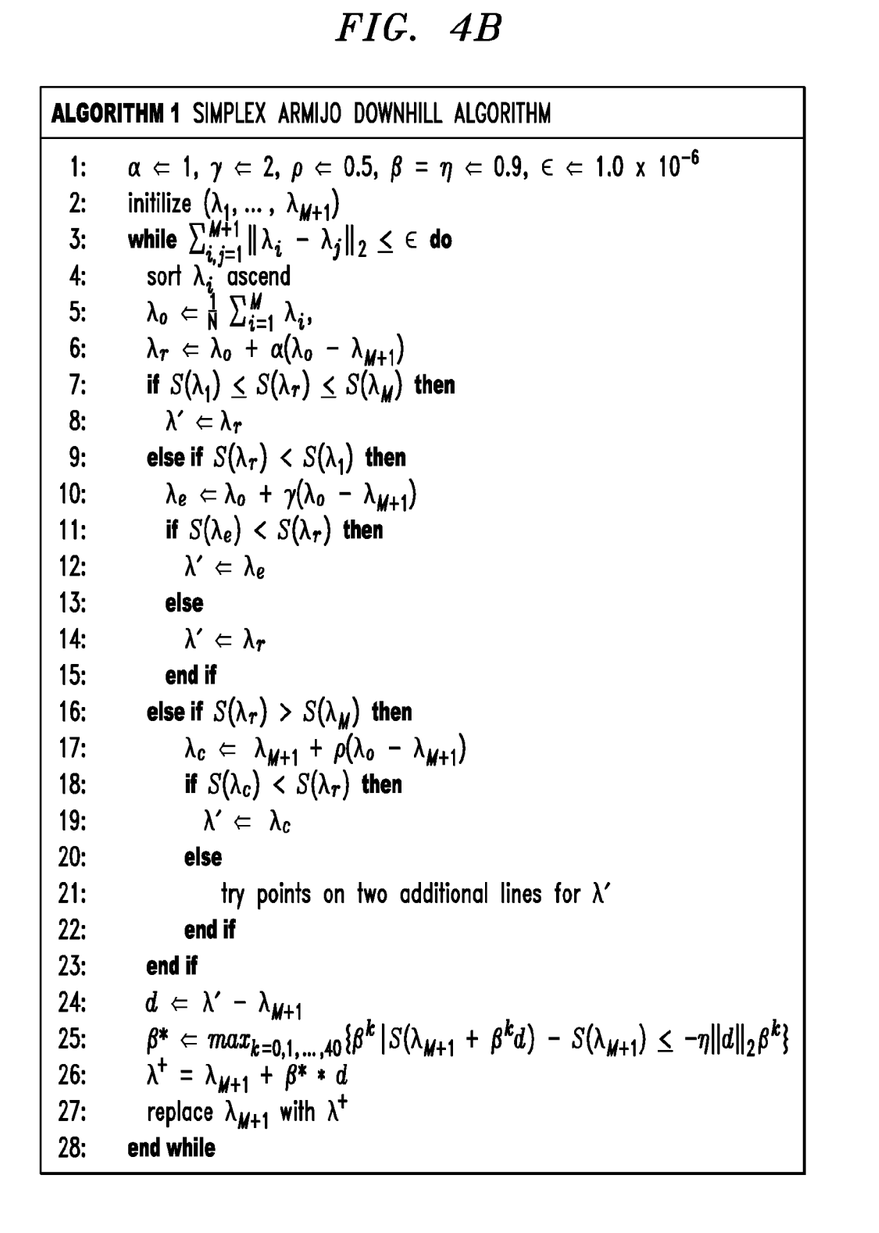
FIG. 4B illustrates a methodology for use in optimizing an automated machine translation system using a conditional translation quality at risk metric, according to an embodiment of the invention.

While principles of the invention are not limited to use of the simplex-downhill algorithm, we will briefly describe the features of such algorithm below. Further details may be found in the above-referenced B. Zhao et al., "A Simplex Armijo Downhill Algorithm for Optimizing Statistical Machine Translation Decoding Parameters." FIG. 4B illustrates a form of the simplex-downhill algorithm that may be employed in an illustrative embodiment.

In this embodiment, we let $\{(e_{i,k}, \bar{c}, S_{i,k}), k \in [1,K]\}$ be the K-Best list for a given input source sentence $f_i$ in a development dataset containing N sentences. Note that $e_{i,k}$ is a English hypothesis at the rank of k; $\bar{c}_{i,k}$ is a cost vector—a vector of feature function values, with M dimensions: $\bar{c}_{i,k} = (c_{i,k,1}, c_{i,k,2} \ldots c_{i,k,M})$; $S_{i,k}$ is a sentence-level translation metric general counter (e.g., n-gram hits for BLEU, or specific types of errors counted in TER, etc.) for the hypothesis. Let $\bar{\lambda}$ be the weight-vector, so that the cost of $e_{i,k}$ is an inner product: $C(e_{i,k}) = \bar{\lambda} \cdot \bar{c}_{i,k}$. The optimization process is then defined as below:

$$k^*(wrti) = \underset{k}{\mathrm{argmin}} \bar{\lambda} \cdot \bar{c}_{i,k} \quad (1)$$

$$\bar{\lambda}^* = \underset{\lambda}{\mathrm{argmin}} Eval\left(\sum_{i=1}^{N} S_{i,k^*}\right), \quad (2)$$

where Eval is an evaluation error metric for machine translation (MT), presuming the smaller the better internal to an optimizer. In our case, we decompose BLEU, TER and (TER-BLEU)/2.0 into corresponding specific counters for each sentence, cache the intermediate counts in $S_{i,k}$, and compute final corpus-level scores using the sum of all counters. Eqn. 1 is simply a ranking process, with regard to the source sentence i, to select the top-1 hypothesis, indexed by k* with the lowest cost $C(e_{i,k^*})$ given current $\bar{\lambda}$. Eqn. 2 is a scoring process of computing the final corpus-level MT metrics via the intermediate counters collected from each top1 hypothesis selected in Eqn. 1. Iteratively, the optimizer picks up an initial guess of $\bar{\lambda}$ using current K-Best list, and reaches a solution $\bar{\lambda}^*$, and then updates the event space with new K-Best list generated using a decoder with $\bar{\lambda}^*$. The optimizer iterates until there is little change to final scores (a local optimal $\bar{\lambda}^*$ is reached).

Accordingly, as shown in FIG. 4B, we integrate the Armijo line search into the simplex-downhill algorithm in Algorithm 1. We take the reflection, expansion and contractions steps from the simplex-downhill algorithm to find a $\lambda'$ to form a direction $\lambda' - \lambda_{M+1}$ as the input to the Armijo algorithm, which in turn updates $\lambda'$ to $\lambda^+$ as the input for the next iteration of simplex-downhill algorithm. The combined algorithm iterates until the simplex shrink sufficiently within a pre-defined threshold. Via Armijo algorithm, we avoid the expensive shrink step, and slightly speed up the searching process of simplex-downhill algorithm. Also, the simplex-downhill algorithm usually provides a descend direction to start the Armijo algorithm efficiently. Both algorithms are well known to converge. Moreover, the algorithm of FIG. 4B changes the searching path of the traditional simplex-downhill algorithm, and usually leads to better local minimal solutions.

To be more specific, Algorithm 1 conducts an iterative search in the while loop from line 3 to line 28 until the stopping criteria on line 3 is satisfied. Within the loop, the algorithm can be logically divided into two major parts: from line 4 to line 24, it does the simplex-downhill algorithm; the rest does the Armijo search. The simplex-downhill algorithm looks for a lower point by trying the reflection (line 6), expansion (line 10) and contraction (line 17) points in the order showed in the algorithm, which turned out to be very efficient. In rare cases, especially for many dimensions (for instance, 10 to 30 dimensions, as in typical statistical machine translation decoders) none of these three points are low enough (line 21), we adapt to select lower points. We avoid the traditional expensive shrink procedure, which is not favorable for a machine translation problem. Instead, we try points on different search lines. Specifically, we test two additional points on the line through the highest point and the lowest point, and on the line through the reflection point and the lowest point. It is worth pointing out that there are many variants of simplex-downhill algorithm that may be employed, however, the implementation described in FIG. 4B can successfully select a lower $\lambda'$ in many translation test cases to enable the simplex to move to a better region of local optimals in the high-dimension space. The embedded Armijo algorithm, in the second part of the loop (line 25), continues to refine the search processes. By backtracking on the segment from $\lambda'$ to $\lambda_{M+1}$, the Armijo algorithm does result in even lower points in many test cases. With the new lower λ' found by the Armijo algorithm, the simplex-downhill algorithm starts over again. The parameters in line 1 can be tuned further. We find that the combination of algorithms in FIG. 4B not only accelerates the searching process to reach similar solutions to the baseline simplex algorithm, but also changes the searching trajectory significantly, leading to even better solutions for machine translation test cases.

Thus, illustrative embodiments described above provide a method that computes risks measures from a set of training data, and uses an embedded simplex-downhill algorithm as described above in FIG. 4B to optimize the influential parameters toward better translations for potentially harder sentences. This enables machine translation systems to provide sophisticated users with better translation quality and satisfies their requests without negatively affecting the average users' expectations.

In another preferred embodiment, this algorithm is used in conjunction with data to adapt the translation engine. For sake of clarity, we assume that the documents to be translated belong to two categories: generic, and pertaining to a specific field, for example, computer user manuals. One of ordinary skill in the art would appreciate how the discussion extends to the case where the data can be divided into generic and into a wide number of specific fields. In this embodiment, we assume the existence of a generic data set, for example a subset of the data used to create the translation system, and of a small amount of data representative of the specific field. In this embodiment, the user can mark errors in the translation of data from the specific field, or correct translation errors. The data modified by the user becomes part of the dataset representative of the specific field, and is used by the translation system to adapt to the specific field, for example, by using the algorithm describe in a previous preferred embodiment. As the translation engine adapts to the specific field using said data, it also ensures that the translation quality on general data does not deteriorate by using the generic data mentioned above, for example, via an optimization algorithm as described above.

In yet another preferred embodiment, the methods and apparatus described in this invention are used in conjunction with a service agreement, where a customer enters a contract with a translation service provider and specifies a service level agreement (SLA) for data in one or more specific field of interest. As part of the SLA, the service provider agrees on a quality schedule for the specific field translation quality as a function of available data, whereby said available data comprises an initial data set and incremental data provided by users who modify the translation errors as described in a previous embodiment. The service provider also agrees to a minimum quality of the translation on generic data irrespective of the quantity of specific domain data available. In this embodiment, the translation service provider for example can use the algorithm described earlier in this section to ensure that the quality of translation on generic data does not degrade below the value agreed with the customer, and that the quality of translation of data for the domain of interest increases as agreed.

Figure 5:
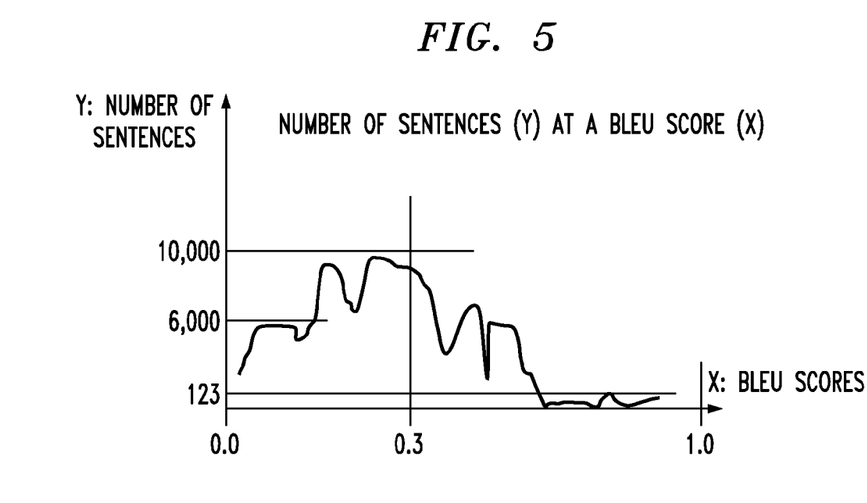
FIG. 5 illustrates a graph of sentence quantity versus metric score before optimization.
Figure 6:
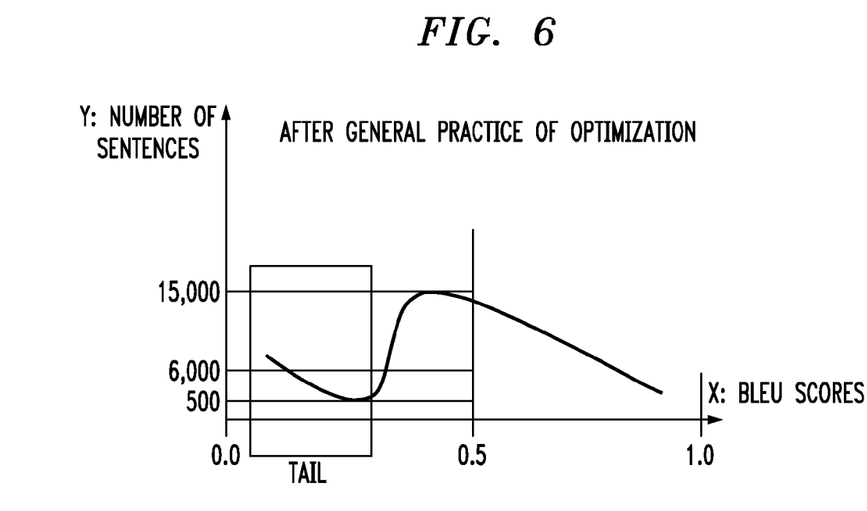
FIG. 6 illustrates a graph of sentence quantity versus metric score after standard optimization.
Figure 7:
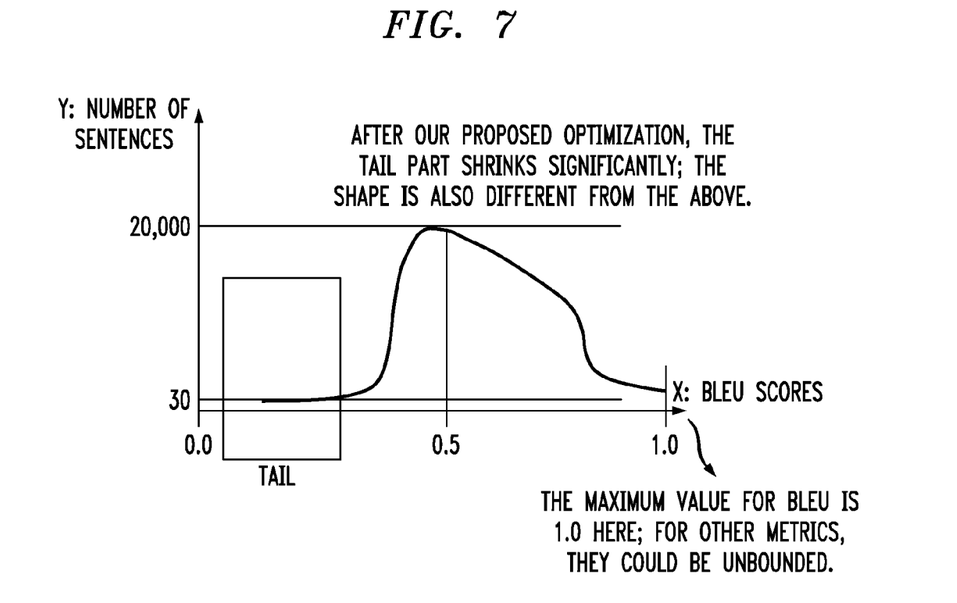
FIG. 7 illustrates a graph of sentence quantity versus metric score after optimization, according to an embodiment of the invention.

Turning now to FIGS. 5 through 7, advantages of the CTQR optimization methodologies of the invention (FIG. 7) are depicted as compared with no optimization (FIG. 5) and standard optimization (FIG. 6). FIG. 5 shows a graph of the number of sentences versus BLEU metric scores before optimization. FIG. 6 shows a graph of the number of sentences versus BLEU metric scores after standard optimization. FIG. 7 shows a graph of the number of sentences versus BLEU metric scores after optimization, according to an embodiment of the invention. Note that, as shown in FIG. 7 which represents a distribution after application of inventive optimization techniques described herein, the tail part of the curve shrinks significantly, and the shape of the curve is advantageously different than those shown in FIGS. 5 and 6.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 1-7, the diagrams in the figures illustrate the architecture, functionality, and operation of possible implementations of systems, methods and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Accordingly, techniques of the invention, for example, as depicted in FIGS. 1-7, can also include, as described herein, providing a system, wherein the system includes distinct modules (e.g., modules comprising software, hardware or software and hardware). By way of example only, the modules may include, but are not limited to, a machine translation (system or engine) module and a CTQR optimization module. These and other modules may be configured, for example, to perform the steps described and illustrated in the context of FIGS. 1-7.

Figure 8:
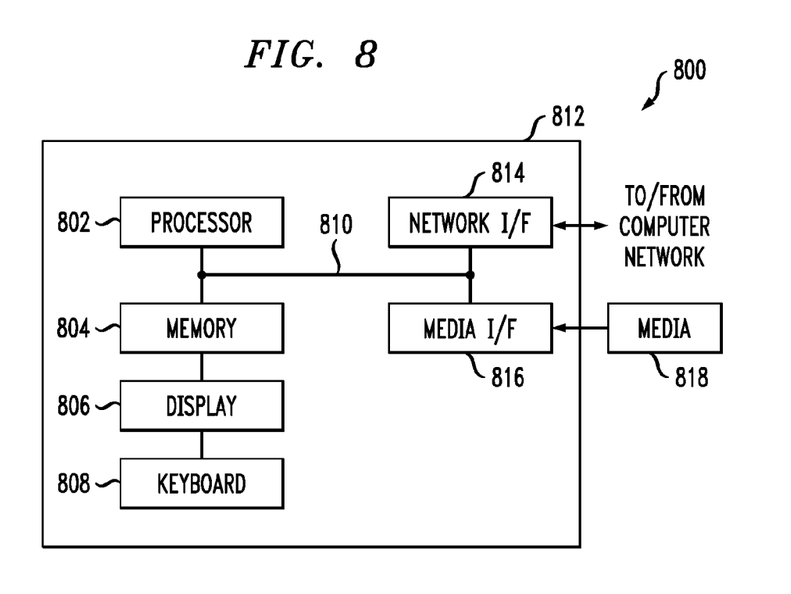
FIG. 8 illustrates a computer system in accordance with which one or more components/steps of the techniques of the invention may be implemented, according to an embodiment of the invention.

One or more embodiments can make use of software running on a general purpose computer or workstation. With reference to FIG. 8, such an implementation 800 employs, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. The processing device is preferably capable of processing video files. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, keyboard or mouse), and one or more mechanisms for providing results associated with the processing unit (for example, display or printer).

The processor 802, memory 804, and input/output interface such as display 806 and keyboard 808 can be interconnected, for example, via bus 810 as part of a data processing unit 812. Suitable interconnections, for example, via bus 810, can also be provided to a network interface 814, such as a network card, which can be provided to interface with a computer network, and to a media interface 816, such as a diskette or CD-ROM drive, which can be provided to interface with media 818.

A data processing system suitable for storing and/or executing program code can include at least one processor 802 coupled directly or indirectly to memory elements 804 through a system bus 810. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard 808 for making data entries; display 806 for viewing machine translation input text and output text; pointing device for selecting and entering data and user feedback; and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modem and Ethernet cards are just a few of the currently available types of network adapters.

As used herein, a "server" includes a physical data processing system (for example, system 812 as shown in FIG. 8) running a server program. It will be understood that such a physical server may or may not include a display and keyboard.

That is, it is to be understood that the components shown in FIG. 1 may be implemented on one server or on more than one server.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, comprising:
optimizing one or more parameters of a natural language processing system so as to improve a measure of quality of an output of the natural language processing system for a first type of data processed by the natural language processing system while maintaining a given measure of quality of an output of the natural language processing system for a second type of data processed by the natural language processing system, wherein the optimizing comprises computing a conditional value at risk metric.

2. The method of claim 1, wherein the first type of data has a substantive complexity that is greater than a substantive complexity of the second type of data.

3. The method of claim 2, wherein the first type of data is presented to the natural language processing system by a first type of user and the second type of data is presented to the natural language processing system by a second type of user.

4. The method of claim 1, wherein the conditional value at risk metric represents a level of risk aversion for one or more users of the natural language processing system associated with the quality of the output of the natural language processing system.

5. The method of claim 1, wherein the conditional value at risk computing step further comprises obtaining one or more input data sets.

6. The method of claim 5, wherein the conditional value at risk computing step further comprises computing initial processing results from the one or more input data sets.

7. The method of claim 6, wherein the initial processing results computing step further comprises computing one or more error metric scores for the one or more input data sets.

8. The method of claim 7, wherein the initial processing results computing step further comprises ranking and sorting the one or more input data sets based on the one or more error scores.

9. The method of claim 8, wherein the initial processing results computing step further comprises computing tail scores based on given percentiles for the one or more ranked and sorted input data sets.

10. The method of claim 6, wherein the initial processing results computing step further comprises obtaining one or more baseline output data sets from the natural language processing system for the one or more input data sets.

11. The method of claim 10, wherein the initial processing results computing step further comprises obtaining user feedback on the one or more baseline output data sets.

12. The method of claim 11, wherein the initial processing results computing step further comprises ranking the one or more baseline output data sets based on the user feedback for given percentiles.

13. The method of claim 6, wherein the conditional value at risk computing step further comprises computing a risk index from at least a portion of the initial processing results.

14. The method of claim 13, wherein the conditional value at risk computing step further comprises generating one or more scores based on the risk index.

15. The method of claim 14, wherein the optimizing step further comprises using the one or more scores to improve the measure of quality of the output of the natural language processing system for subsequently presented data of the first type while maintaining the given measure of quality of the output for subsequently presented data of the second type.

16. The method of claim 1, wherein the optimizing step further comprises:
computing a distribution of the quality of the output across sophisticated and other users of the natural language processing system;
computing a conditional quality at risk from the distribution; and
utilizing a lower-dimension line search to optimize the one or more parameters of the natural language processing system for the computed conditional quality at risk.

17. The method of claim 1, wherein the natural language processing system comprises a machine translation system, and the output is a translation of an input document into a different language.

18. Apparatus, comprising:
a memory; and
a processor device operatively coupled to the memory and configured to optimize one or more parameters of a natural language processing system so as to improve a measure of quality of an output of the natural language processing system for a first type of data processed by the natural language processing system while maintaining a given measure of quality of an output of the natural language processing system for a second type of data processed by the natural language processing system, wherein the processor device is further configured to perform the optimization by computing a conditional value at risk metric.

19. The apparatus of claim 18, wherein the first type of data has a substantive complexity that is greater than a substantive complexity of the second type of data.

20. The apparatus of claim 19, wherein the first type of data is presented to the natural language processing system by a first type of user and the second type of data is presented to the natural language processing system by a second type of user.

21. The apparatus of claim 18, wherein the conditional value at risk metric represents a level of risk aversion for one or more users of the natural language processing system associated with the quality of the output of the natural language processing system.

22. The apparatus of claim 18, wherein the natural language processing system comprises a machine translation system, and the output is a translation of an input document into a different language.

23. An article of manufacture comprising a computer readable storage medium having tangibly embodied thereon computer readable program code which, when executed, causes a processor device to optimize one or more parameters of a natural language processing system so as to improve a measure of quality of an output of the natural language processing system for a first type of data processed by the natural language processing system while maintaining a given measure of quality of an output of the natural language processing system for a second type of data processed by the natural language processing system, wherein the processor device performs the optimization by computing a conditional value at risk metric.

* * * * *